(12) United States Patent
Cross et al.

(10) Patent No.: US 7,498,290 B2
(45) Date of Patent: Mar. 3, 2009

(54) MERCURY REMOVAL SORBENT

(75) Inventors: Joseph B. Cross, Bartlesville, OK (US); Glenn W. Dodwell, Bartlesville, OK (US); Marvin M. Johnson, Bartlesville, OK (US); Edward L. Sughrue, II, Bartlesville, OK (US); Jianhua Yao, Bartlesville, OK (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 12/141,997

(22) Filed: Jun. 19, 2008

(65) Prior Publication Data

US 2008/0254979 A1 Oct. 16, 2008

Related U.S. Application Data

(62) Division of application No. 11/071,633, filed on Mar. 3, 2005, now Pat. No. 7,404,939.

(51) Int. Cl.
*B01J 21/06* (2006.01)
*B01J 23/22* (2006.01)

(52) U.S. Cl. .............. 502/353; 502/400; 502/439; 502/514

(58) Field of Classification Search ............ 502/353, 502/400, 439, 514
See application file for complete search history.

(56) References Cited

U.S. PATENT DOCUMENTS

| 4,012,338 | A | * | 3/1977 | Urwin | 502/350 |
|---|---|---|---|---|---|
| 4,238,370 | A | * | 12/1980 | Konig | 502/350 |
| 4,282,116 | A | * | 8/1981 | Reuter et al. | 502/350 |
| 4,835,126 | A | | 5/1989 | Wachs et al. | |
| 5,049,537 | A | * | 9/1991 | Najjar et al. | 502/350 |
| 5,139,982 | A | * | 8/1992 | Ayala et al. | 502/182 |
| 5,607,496 | A | | 3/1997 | Brooks | |
| 5,696,049 | A | | 12/1997 | Ikeyama et al. | |
| 5,785,932 | A | | 7/1998 | Helfritch | |
| 5,986,110 | A | | 11/1999 | Geus et al. | |
| 6,248,217 | B1 | | 6/2001 | Biswas et al. | |
| 6,274,763 | B1 | * | 8/2001 | Ruedinger et al. | 562/548 |
| 6,350,918 | B2 | | 2/2002 | Wachs et al. | |
| 6,380,128 | B1 | | 4/2002 | Ji et al. | |
| 6,638,485 | B1 | * | 10/2003 | Iida et al. | 423/210 |
| 2003/0170159 | A1 | * | 9/2003 | Honjo et al. | 423/210 |
| 2004/0202596 | A1 | * | 10/2004 | Honjo et al. | 423/210 |
| 2005/0112042 | A1 | * | 5/2005 | Honjo et al. | 423/210 |
| 2005/0112044 | A1 | * | 5/2005 | Kuma et al. | 423/210 |
| 2005/0207955 | A1 | * | 9/2005 | Wang | 423/210 |

* cited by examiner

*Primary Examiner*—Timothy C Vanoy
(74) *Attorney, Agent, or Firm*—Jeffrey R. Anderson

(57) ABSTRACT

A sorbent composition comprising a vanadium compound and a $TiO_2$ support material is disclosed. Methods of making and using the composition to remove heavy metals or heavy metal containing compounds from a fluid stream are also provided. Such methods are particularly useful in the removal of mercury and mercury compounds from flue gas streams produced from the combustion of hydrocarbon-containing materials such as coal and petroleum fuels.

24 Claims, 2 Drawing Sheets

MERCURY REMOVAL SORBENT

This is a divisional of application Ser. No. 11/071,633 filed Mar. 3, 2005, now issued as U.S. Pat. No. 7,404,939.

The invention relates to a composition and method for removing heavy metal contaminants from fluid streams. In one aspect, the invention relates to a method of preparing such composition. In yet another aspect, the invention relates to a process for removing heavy metal contaminants, such as mercury and mercury compounds, from flue gas streams produced from the combustion of hydrocarbon-containing materials.

BACKGROUND OF THE INVENTION

Heavy metals are released during the combustion process of many fossil fuels and/or waste materials. These heavy metals include, for example, arsenic, beryllium, lead, cadmium, chromium, nickel, zinc, mercury, and barium. Most of these heavy metals are toxic to humans and animals. In particular, elemental mercury and mercury compounds such as mercury chlorides are thought to compromise the health and mental acuity of young children and fetuses.

Furthermore, there is every indication that the amount of mercury, and possibly of other heavy metals, now legally allowed to be released by those combusting various fossil fuels and/or waste materials, including coal burning powerplants and petroleum refineries, will be reduced by future legislation. While a variety of adsorbents are available for capture of heavy metals (in particular mercury), these adsorbents tend to have low capacities and are easily deactivated by other components in the gas stream, such as sulfur oxides. Thus, there exists a need for a material that removes elemental mercury from gas streams and has a high capacity for retaining mercury as a nonvolatile compound.

SUMMARY OF THE INVENTION

It is an object of the present invention to provide an improved vanadium material with a high capacity for sorbing heavy metals and heavy metal compounds.

A further object of this invention is to provide a method for making an improved vanadium incorporated sorbent material by incorporating a vanadium-containing compound with a porous support material.

Another object of this invention is to provide a process for removing heavy metals or heavy metal compounds from a fluid stream by contacting the fluid stream with an improved vanadium incorporated sorbent material.

Yet another object of this invention is to provide an improved vanadium material which when used in the removal of heavy metals results in the oxidation of the heavy metal to an oxidation state greater than zero.

It should be understood that the above-listed objects are only exemplary, and not all the objects listed above need be accomplished by the invention described and claimed herein.

In accordance with a first embodiment of the invention, the inventive composition is prepared by a method comprising the steps of: (a) incorporating into, onto, or into and onto a porous $TiO_2$ support a mixture including a source of vanadate ions, a solvent capable of solubilizing said source of vanadate ions, and an oxidizing agent; (b) drying said vanadate incorporated $TiO_2$ material; and (c) calcining said dried vanadium incorporated $TiO_2$ material.

In accordance with a second embodiment of the invention, the inventive composition is prepared by a method comprising the steps of: (a) preparing a mixture comprising a source of vanadate ions and a solvent capable of solubilizing said source of vanadate ions; (b) adding a quantity of an oxidizing agent to said mixture; (c) intimately mixing said mixture with a quantity of titanium dioxide ($TiO_2$) particles; (d) drying said intimate mixture thereby forming a vanadium incorporated $TiO_2$ material; and (e) calcining said vanadium incorporated $TiO_2$ material.

In accordance with a third embodiment of the invention, the inventive composition can be used in the removal of at least one heavy metal or heavy metal containing compound from a fluid stream by (a) contacting the fluid stream with a porous $TiO_2$ support material having incorporated onto, into, or onto and into a vanadium containing compound for sorption of at least a portion of the at least one heavy metal or heavy metal containing compound.

In accordance with a fourth embodiment of the invention, the inventive composition can be used in the removal of at least one heavy metal or heavy metal containing compound from a flue gas stream produced by the combustion of a hydrocarbon-containing fuel by: (a) contacting the flue gas stream with a first sorbent material comprising a porous $TiO_2$ support material having incorporated onto, into, or onto and into a vanadium containing compound for sorbing at least a portion of the at least one heavy metal or heavy metal containing compound present in the flue gas stream; and (b) contacting the flue gas with a second sorbent material different from the first sorbent material for sorbing at least a portion of the at least one heavy metal-containing compound not sorbed during step (a).

Other objects and advantages of the invention will become apparent from the detailed description and the appended claims.

BRIEF DESCRIPTION OF THE FIGURES

A preferred embodiment of the present invention is described in detail below with reference to the attached figures, wherein.

DETAILED DESCRIPTION OF THE INVENTION

Figure 1:
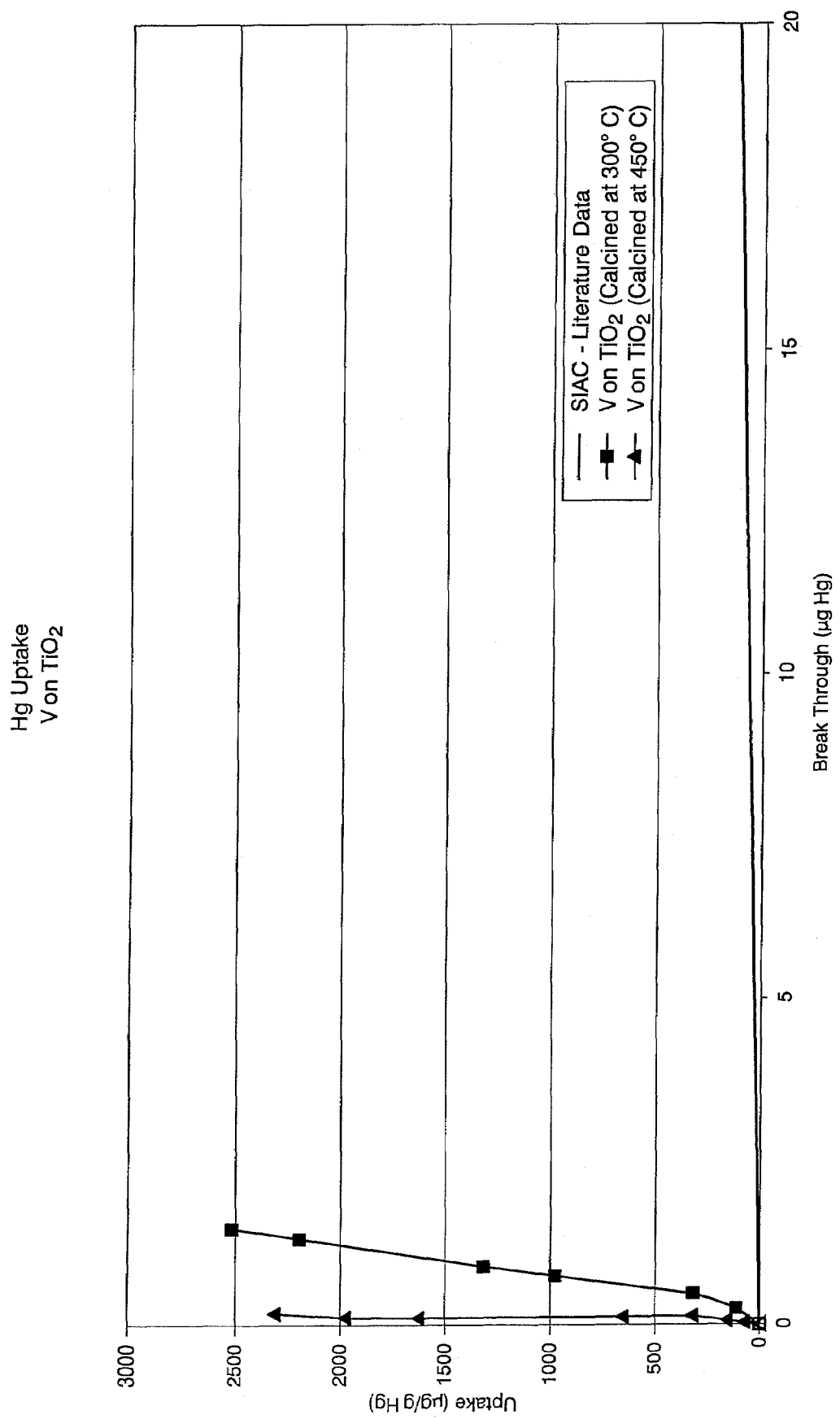
FIG. 1 is a graph of mercury uptake versus mercury breakthrough for a vanadium incorporated $TiO_2$ sorbent compared to a conventional activated charcoal sorbent.

Compositions according to the present invention generally comprise a porous $TiO_2$ support material having incorporated thereon, therein, or thereon and therein a vanadium-containing compound. Preferably, the vanadium compound is any such compound wherein the vanadium component is in a +5 oxidation state. Preferably, the vanadium-containing compound comprises a vanadium oxide, more preferably $V_2O_5$ or a vanadate ($—VO_3$) group, such as in ammonium vanadate ($NH_4VO_3$). However, it is within the scope of the invention for the vanadium component to have any oxidation state greater than zero.

The porous $TiO_2$ support material generally comprises at least about 50% by weight of the total composition, preferably between about 50-99% by weight, more preferably between about 75-95% by weight, and most preferably between about 80-90% by weight. In order to maximize the sorptive capacity of the composition, the support material preferably has a surface area of at least about 75 $m^2/g$, more preferably at least about 100 $m^2/g$, and most preferably at least about 150 $m^2/g$.

The overall composition preferably comprises from about 0.5-40% by weight vanadium. Unless otherwise specified, the phrase "by weight vanadium" is defined as the elemental weight of vanadium present in the composition. More preferably, the composition comprises from about 1-35% by weight vanadium, and most preferably from about 2-25% by weight.

In one embodiment, the sorbent material is formed by incorporating into, onto, or into and onto a porous $TiO_2$ support a mixture including a source of vanadate ions, a solvent capable of solubilizing the source of vanadate ions, and an oxidizing agent. Preferably, the source of vanadate ions is $NH_4VO_3$, however, other sources of vanadate ions such as alkali metal vanadates may be used. As noted above, it is preferable for the vanadium present in the vanadate ions to have a +5 oxidation state. The selection of the solvent for solubilizing the vanadium-containing compound is important in achieving this objective. However, it is also preferable to add an oxidizing agent to the mixture to ensure that the vanadium maintains a +5 oxidation state. In this regard, preferred solvents for use with the present invention include those selected from the group consisting of oxalic acid, $HNO_3$, HCl, and mixtures thereof, with oxalic acid being particularly preferred. Preferred oxidizing agents for use with the present invention include those selected from the group consisting of $H_2SO_4$, $HNO_3$, permanganate, ozone, $H_2O_2$, and mixtures thereof, with $H_2O_2$ being particularly preferred. Preferably, the oxidizing agent is added in a sufficient quantity so as to maintain the vanadium present in the vanadate ions in a +5 oxidation state, more preferably, this involves the presence of about 0.1-25% by weight oxidizing agent based on the weight of the vanadate solution, and most preferably from about 1-10% by weight. It is possible for a single material to act as both a solvent and oxidizing agent, however, it is most preferable for the oxidizing agent to be a composition different from the solvent. When preparing small batches of sorbent material in accordance with the present invention, it is preferable for the oxidizing agent to be added to the vanadate solution slowly, and more preferably in a drop wise manner.

Next, the vanadate mixture is combined with a quantity of $TiO_2$ particles thereby forming a vanadium incorporated $TiO_2$ material. Preferably, the vanadate mixture is intimately mixed with the $TiO_2$ particles so that at least a portion of the vanadate ions impregnate the $TiO_2$ support. By impregnating the pores of the support material, the surface area available for heavy metal sorption is significantly increased. As used herein, the term "impregnate" means that the vanadate ions at least partially fill in or infuse the pores of the $TiO_2$ support.

The vanadium incorporated $TiO_2$ material is then dried to remove the excess solvent. Preferably, this drying step involves heating the vanadium incorporated $TiO_2$ material to a temperature of at least about 212° F. depending upon the solvent used. Following removal of the excess solvent, the dried vanadium incorporated $TiO_2$ material is calcined. As demonstrated in the examples below, the calcination temperature appears to impact the sorptive capacity of the sorbent material, with calcination at higher temperatures tending to correspond to increased sorptive capacity. Therefore, it is preferable that during the calcination step the dried vanadium incorporated $TiO_2$ material be heated to a temperature of between about 482-1472° F., most preferably between about 572-1112° F., and most preferably between about 662-932° F. During the calcination step, it is possible for at least a portion of the vanadate ions to be converted to a vanadium oxide compound such as $V_2O_5$.

The inventive sorbent material is particularly useful in the removal of heavy metals and heavy metal containing compounds from fluid streams, especially flue gas streams produced by the combustion of hydrocarbon-containing materials such as coal and petroleum fuels. As noted above, such fluid streams are often contaminated with at least one heavy metal or compound containing a heavy metal selected from the group consisting of arsenic, beryllium, lead, cadmium, chromium, nickel, zinc, mercury, and barium. In one aspect, methods of removing heavy metal and heavy metal containing compounds from fluid streams comprise providing a sorbent composition according to the present invention and contacting the stream with the inventive sorbent.

Flue gas, such as that created by the combustion of hydrocarbon-containing compounds, generally comprises at least about 10% by weight $N_2$, more preferably at least about 50% by weight, and most preferably between about 75-90% by weight. Flue gas also generally comprises less than about 10% by weight of uncombusted hydrocarbons, more preferably less than about 5% by weight, and most preferably less than about 1% by weight. As described below, in a particularly preferred application, the flue gas will have already been treated for removal of $NO_x$ and $SO_x$ prior to any heavy metal removal process as the presence of high levels of $NO_x$ and $SO_x$ compounds may lead to fouling of the heavy metal removal sorbents. Generally, the flue gas comprises less than about 800 ppm of $SO_x$ compounds such as $SO_2$, more preferably less than about 500 ppm, and most preferably less than about 400 ppm. Also, the flue gas preferably comprises less than about 400 ppm $NO_x$ such as NO and $NO_2$, more preferably less than about 250 ppm, and most preferably less than about 150 ppm. Flue gas may also comprise between about 2.5-10% by weight $O_2$, between about 1-5% by weight $CO_2$, and between about 5-20% by weight $H_2O$.

Preferably, the pressure drop associated with the contacting step should not exceed more than about 20 psia. More preferably, the pressure drop in the fluid stream is less than about 10 psia, and most preferably less than about 5 psia. Typically, flue gas streams do not flow under high pressures. Therefore, if the pressure drop is too great, back pressure is created and can affect the combustion process by which the flue gas is created. The arrangement of the sorbent material in the vessel in which contacting occurs can assist in minimizing this pressure drop. Preferably, the sorbent material comprises finely divided particles that are suspended in the fluid stream during the contacting step. Alternatively, the sorbent material may be positioned in a fluidized bed, placed in a packed bed column, formed into monoliths, or incorporated into a foam. With the latter arrangements, pressure drop may become much more of a concern and may require the use of fans or other equipment to increase the pressure of the flue gas stream.

The fluid stream containing the heavy metal contaminant preferably has a temperature of between about 50-400° F. during the contacting step, more preferably between about 100-375° F., and most preferably between about 200-350° F. The temperature of the fluid stream at the contacting stage is in part affected by upstream processes such as particulate removal systems (i.e., cyclones), other contaminant removal systems, heat exchange systems, etc. The contacting step results in the sorption of at least about 80% by weight of the heavy metals contained in the fluid stream, more preferably at least about 90% by weight, even more preferably at least about 95% by weight, and most preferably at least about 98% by weight. As previously stated, the vanadium incorporated $TiO_2$ support material exhibits a high capacity for sorbing heavy metals and heavy metal containing compounds. Preferably, the vanadium incorporated $TiO_2$ material is capable of sorbing at least about 1 atom of a heavy metal per every 5 atoms of vanadium. More preferably, the ratio of heavy metal atoms sorbed to vanadium atoms is at least about 1:3, and most preferably 1:1.

The sorbent material also exhibits the ability to oxidize the elemental heavy metal into a heavy metal containing compound such as a heavy metal oxide or chloride. Using mercury as an example, the sorbent material oxidizes mercury into various oxidized species such as $Hg^{+1}$, $Hg^{+2}$, or mercury compounds such as HgO, HgCl, and $HgCl_2$. At times, due to system inefficiencies or sorbent saturation, some of these heavy metal containing compounds may desorb or break free from the sorbent material. In that case, it can be particularly useful to employ a downstream heavy metal compound removal system in conjunction with the above-described sorbent system. In the heavy metal compound removal system, the gaseous product stream is contacted with a separate adsorbent in an adsorption zone. The adsorbent can be any adsorbent capable of adsorbing a heavy metal; however, preferred materials for removing the heavy metal compounds include those having a hydrophobic surface with pore openings of less than about 10 Å, and high pore volumes. More preferably, the adsorbent comprises, consists of or consists essentially of a material selected from the group consisting of a zeolite, amorphous carbon and combinations thereof. The amorphous carbon can be an activated carbon and/or activated charcoal. Exemplary zeolites include those with 8-12 member ring openings, and particularly ZSM-5 zeolite. Furthermore, the material may be in the form of granules, pellets, monoliths, powders that are collected on filters, or combinations thereof. A treated gaseous product stream is withdrawn from the adsorption zone and contains less than about 20 weight %, preferably less than about 10 weight %, and more preferably less that about 5 weight % of the heavy metal in the gaseous feed stream.

The heavy metal compound removal system may be contained in a separate downstream vessel from the vanadium incorporated $TiO_2$ sorbent, or can be situated along with the vanadium incorporated $TiO_2$ sorbent in a multiple stage contacting vessel so that the flue gas first contacts the vanadium incorporated $TiO_2$ sorbent followed by the heavy metal compound removal sorbent.

While the vanadium incorporated $TiO_2$ sorbent material exhibits a relatively high capacity for sorbing heavy metals and heavy metal containing compounds, its cost is relatively higher than the cost for conventional heavy metal compound sorbent materials such as zeolite. Therefore, from an economic standpoint, it may be desirable to employ a relatively small amount of the vanadium incorporated $TiO_2$ sorbent compared to the conventional sorbent material. Once the sorptive capacity of the vanadium incorporated $TiO_2$ sorbent has sufficiently diminished, it will not be able to sorb sufficient quantities of the heavy metal containing compounds formed by the catalytic action of the vanadium incorporated $TiO_2$ sorbent. These heavy metal containing compounds may then be sorbed by the lesser expensive heavy metal compound sorbent material located downstream from the vanadium incorporated $TiO_2$ sorbent.

The heavy metal compound removal system preferably results in the sorption of at least about 80% by weight of the heavy metal containing compounds that break through the vanadium incorporated $TiO_2$ sorbent material, more preferably at least about 90% by weight, and most preferably at least about 95% by weight.

In addition to the vanadium incorporated $TiO_2$ sorbent material becoming saturated, the overall sorptive efficiency may be affected by the presence of $NO_x$, and $SO_x$ compounds present in the flue gas. For example, $SO_2$ contained in the flue gas stream may be oxidized to $SO_3$ and then converted to $H_2SO_4$ in the presence of water. The $H_2SO_4$ then may fill the pores of the vanadium incorporated $TiO_2$ sorbent thereby decreasing the sorptive capacity thereof and blocking active catalyst sites. Therefore, it is preferable to employ an upstream $NO_x$ and $SO_x$ removal process in order to avoid fouling of the vanadium incorporated $TiO_2$ sorbent material. Any conventional $NO_x$ and $SO_x$ removal process would be suitable for use with the present invention. The $NO_x$ and $SO_x$ removal process should preferably remove at least about 50% by weight of all $NO_x$ and $SO_x$ present in the flue gas stream. It is preferable for the flue gas stream immediately prior to contact with the vanadium incorporated $TiO_2$ sorbent to comprise less than about 400 ppm $NO_x$, more preferably less than about 250 ppm, and most preferably less than about 150 ppm. Likewise, it is preferable for the flue gas stream immediately prior to contact with the vanadium incorporated $TiO_2$ sorbent to comprise less than about 800 ppm $SO_x$, more preferably less than about 500 ppm, and most preferably less than about 400 ppm.

The heavy metal compound removal system is capable of performing effectively even at high flue gas flow rates (i.e., >10,000 gas hourly space velocity). The sorbent material used in the heavy metal compound removal system may be placed in a fluidized or packed bed vessel, however, as with the vanadium incorporated $TiO_2$ sorbent material system above, the pressure drop of the flue gas stream should be minimized to avoid requiring the use of additional equipment to compensate for the pressure drop.

EXAMPLE

The following example illustrates preferred sorbent materials and methods of making the same in accordance with the present invention. This example should not be taken as limiting the scope of the present invention in any way.

In this example, a sorbent material according to the present invention was prepared by first dissolving 51.4 g ammonium metavanadate ($NH_4VO_3$) in 440 g of oxalic acid. In order to maintain the vanadium in its +5 oxidation state (indicated by a reddish color), hydrogen peroxide was added drop wise to the solution (approximately 120 drops were used). The $NH_4VO_3$ solution was then mixed with 200 g of $TiO_2$ in four steps thereby impregnating the $NH_4VO_3$ onto the $TiO_2$ by incipient wetness. In each step, 125 g of the $NH_4VO_3$ solution was added and the material dried at 248° F. (120° C.) for one hour before beginning the next step. Next, 20 g aliquots of the material were calcined at 45-degree increments from 572-932° F. (300-500° C.).

Two aliquots were tested for efficacy in removing elemental mercury entrained in an air stream at a concentration of approximately 1000 μg/m³ (ppb w/v); the first aliquot being the material calcined at 572° F. (300° C.) and the second aliquot being the material calcined at 842° F. (450° C.). Portions of the sorbent were placed in a fixed bed reactor, the temperature of which was held constant at 302° F. (150° C.). The air flow rate through the fixed bed reactor was set at a gas hourly space velocity of approximately 10,000. The air stream entering and exiting the fixed bed reactor was periodically analyzed using a Jerome Mercury Analyzer.

Figure 2:
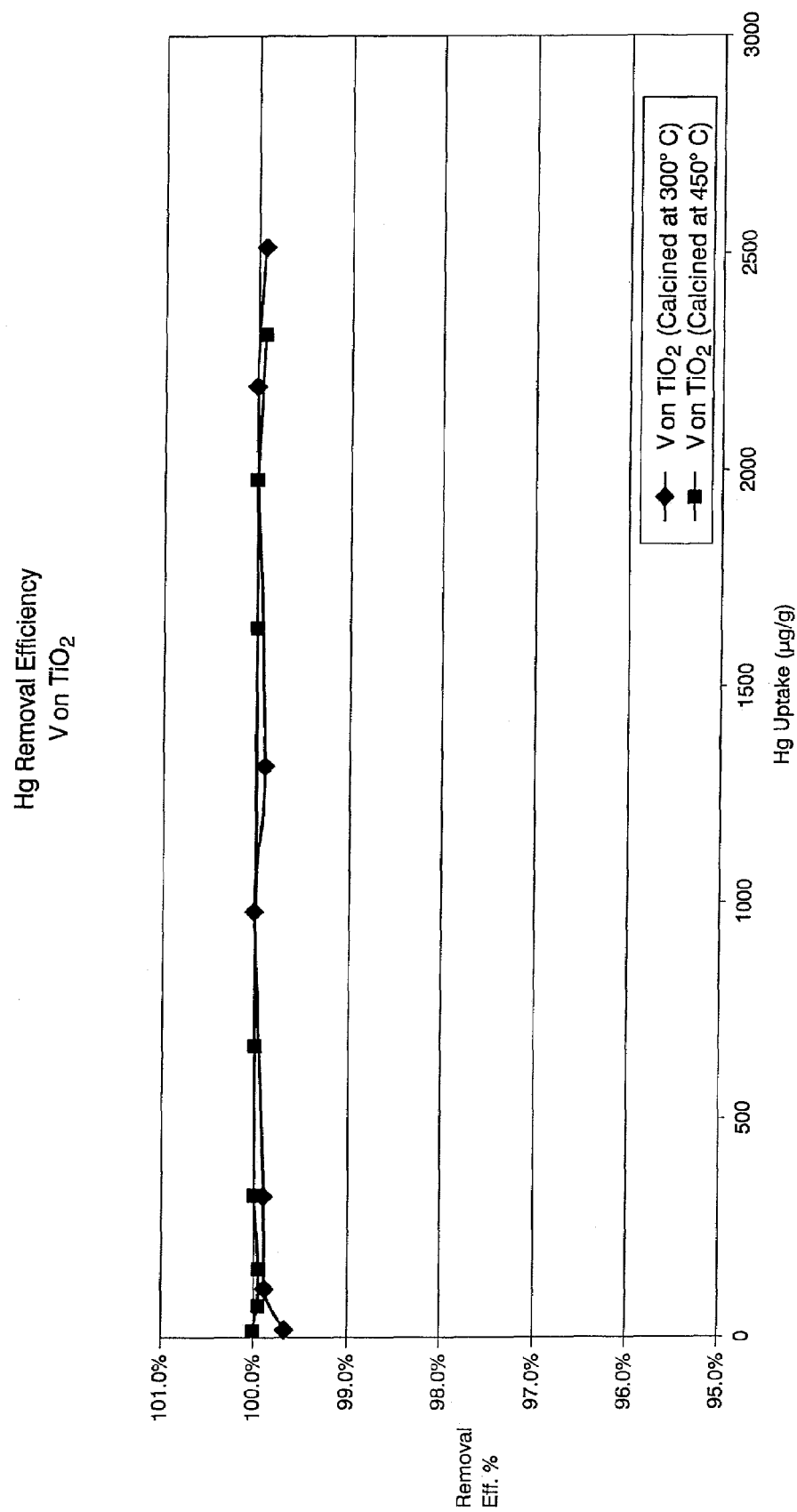
FIG. 2 is a graph of the mercury removal efficiency for a vanadium incorporated $TiO_2$ sorbent.

FIG. 1 shows the mercury uptake versus the mercury breakthrough of the two sorbent materials tested. For purposes of comparison, literature data for sulfur impregnated activated charcoal (SIAC), a conventional sorbent for this application, is also shown. The vanadium/$TiO_2$ materials demonstrated excellent capacity for sequestering mercury when compared with the SIAC literature data. The material calcined at the higher temperature exhibited a tremendous capacity even greater than that of the material calcined at 572° F. (300° C.). FIG. 2 further demonstrates the effectiveness of the sorbent materials in removing mercury from the air stream in terms of efficiency of the sorbent versus mercury uptake. The sorbent materials exhibited greater than 95% efficiency over extended test periods. In sum, the test results indicate that the vanadium/$TiO_2$ materials have a high capacity for sorbing mercury and are exceptionally efficient in mercury removal. Furthermore, the vanadium/$TiO_2$ sorbents tend to remain active even when heated to extreme temperatures, such as those required to remove mercury from spent sorbent material. This indicates that the sorbent is capable of being regenerated without significant loss of activity.

That which is claimed is:

1. A method for forming a sorbent material comprising:
   (a) incorporating into, onto, or into and onto a porous $TiO_2$ support a mixture including a source of vanadate ions, a solvent capable of solubilizing said source of vanadate ions, and an oxidizing agent;
   (b) drying said vanadate incorporated $TiO_2$ material; and
   (c) calcining said dried vanadium incorporated $TiO_2$ material.

2. A method in accordance with claim 1 wherein said source of vanadate ions comprises $NH_4VO_3$.

3. A method in accordance with claim 1 wherein step (a) includes impregnating said $TiO_2$ support with said source of vanadate ions.

4. A method in accordance with claim 1 wherein step (a) includes dissolving said source of vanadate ions in said solvent followed by the addition of said oxidizing agent so as to maintain the vanadium present in said vanadate ions in a +5 oxidation state.

5. A method in accordance with claim 1 wherein said solvent is selected from the group consisting of oxalic acid, $HNO_3$, HCl, and mixtures thereof.

6. A method in accordance with claim 1 wherein said oxidizing agent is different from said solvent and selected from the group consisting of $H_2SO_4$, $HNO_3$, permanganate, ozone, $H_2O_2$, and mixtures thereof.

7. A method in accordance with claim 1 wherein step (c) includes heating said dried vanadium incorporated $TiO_2$ material to a temperature of between about 482-1472° F.

8. A method in accordance with claim 7 wherein step (c) includes heating said dried vanadium incorporated $TiO_2$ material to a temperature of between about 572-1112° F.

9. A method in accordance with claim 1 wherein said vanadium oxide compound comprises $V_2O_5$, a hydrate of $V_2O_5$, a peroxo complex of vanadium oxide, or mixtures thereof.

10. A method in accordance with claim 1 wherein said calcined vanadium incorporated $TiO_2$ material comprises from about 0.5-40% by weight vanadium on an elemental basis.

11. A method in accordance with claim 1 wherein said oxidizing agent is present in the vanadate ion containing mixture of step (a) at a level of about 0.01-25% by weight.

12. A method for forming a sorbent material comprising:
   (a) preparing a mixture comprising a source of vanadate ions and a solvent capable of solubilizing said source of vanadate ions;
   (b) adding a quantity of an oxidizing agent to said mixture;
   (c) intimately mixing said mixture with a quantity of $TiO_2$ particles;
   (d) drying said intimate mixture thereby forming a vanadium incorporated $TiO_2$ material; and
   (e) calcining said vanadium incorporated $TiO_2$ material.

13. A method in accordance with claim 12 wherein said solvent is selected from the group consisting of oxalic acid, $HNO_3$, HCl, and mixtures thereof.

14. A method in accordance with claim 12 wherein said oxidizing agent is different from said solvent and selected from the group consisting of $H_2SO_4$, $HNO_3$, permanganate, ozone, $H_2O_2$, and mixtures thereof.

15. A method in accordance with claim 12 wherein said source of vanadate ions comprises $NH_4VO_3$.

16. A method in accordance with claim 12 wherein said oxidizing agent is added to said mixture in step (b) so as to provide from about 0.01-25% of the total weight of the mixture.

17. A method in accordance with claim 12 wherein step (c) includes impregnating said $TiO_2$ particles with said vanadate ions.

18. A method in accordance with claim 12 wherein step (d) includes heating said mixture to a temperature of at least about 212° F.

19. A method in accordance with claim 12 wherein step (b) includes the drop wise addition of said oxidizing agent to said mixture.

20. A method in accordance with claim 12 wherein said oxidizing agent is added in a sufficient quantity so as to maintain the vanadium present in said vanadate ions in a +5 oxidation state.

21. A method in accordance with claim 12 wherein step (e) includes heating said vanadium incorporated $TiO_2$ material to a temperature of between about 482-1472° F.

22. A method in accordance with claim 21 wherein step (e) includes heating said vanadium incorporated $TiO_2$ material to a temperature of between about 572-1112° F.

23. A method in accordance with claim 12 wherein said vanadium oxide compound comprises $V_2O_5$, a hydrate of $V_2O_5$, a peroxo complex of vanadium oxide, or mixtures thereof.

24. A method in accordance with claim 12 wherein said vanadium incorporated $TiO_2$ material comprises from about 0.5-40% by weight vanadium on an elemental basis.

* * * * *